(12) United States Patent
Hood et al.

(10) Patent No.: US 8,714,011 B2
(45) Date of Patent: May 6, 2014

(54) SNAP-FIT MEASURING CONTAINER

(75) Inventors: Lance L. Hood, Seattle, WA (US);
Jennifer K. Cotter, Seattle, WA (US);
Justin Bagley, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 26 days.

(21) Appl. No.: 13/537,590

(22) Filed: Jun. 29, 2012

(65) Prior Publication Data

US 2012/0273380 A1 Nov. 1, 2012

Related U.S. Application Data

(63) Continuation-in-part of application No. 13/023,252, filed on Feb. 8, 2011.

(51) Int. Cl.
*G01F 19/00* (2006.01)

(52) U.S. Cl.
USPC .......................................................... 73/429

(58) Field of Classification Search
USPC .......................................................... 73/429
See application file for complete search history.

(56) References Cited

U.S. PATENT DOCUMENTS

| | | |
|---|---|---|
| 153,159 A | 7/1874 | Dinwiddie |
| 423,018 A | 3/1890 | Young |
| 1,228,373 A | 5/1917 | Kristofek |
| 1,959,857 A * | 5/1934 | Davis ............................ 215/395 |
| D156,850 S | 1/1950 | Shirley |
| 2,654,253 A | 10/1953 | Davis |
| 2,758,771 A | 8/1956 | Bauer |
| D197,025 S | 12/1963 | Marcus |
| D200,920 S | 4/1965 | Surratt |
| D207,116 S | 3/1967 | Phillips |
| D211,047 S | 5/1968 | Johnson |
| 3,381,849 A * | 5/1968 | Karlssson ...................... 206/520 |
| 3,400,591 A | 9/1968 | Larson |
| 3,490,290 A | 1/1970 | Bilson |
| 3,526,138 A * | 9/1970 | Swett et al. ...................... 73/426 |
| 2,099,430 A | 11/1973 | Quea |
| 3,795,062 A | 3/1974 | Lamb |
| 3,931,741 A | 1/1976 | Ceccarelli |
| D247,412 S | 3/1978 | Montesi |
| D257,549 S | 11/1980 | Chapman |
| D294,213 S | 2/1988 | Chasen |
| D302,920 S | 8/1989 | Ancona et al. |
| D306,324 S | 2/1990 | Dykes |
| D321,328 S | 11/1991 | Duquet |
| 5,137,316 A * | 8/1992 | Foos .............................. 294/180 |
| D332,579 S | 1/1993 | Goldman |
| D344,686 S | 3/1994 | Weterrings |
| 5,419,454 A | 5/1995 | Stowell et al. |
| D396,011 S | 7/1998 | Henriksson |

(Continued)

FOREIGN PATENT DOCUMENTS

CA 111366 10/2006

*Primary Examiner* — Lisa Caputo
*Assistant Examiner* — Jamel Williams
(74) *Attorney, Agent, or Firm* — Lowe Graham Jones PLLC

(57) ABSTRACT

One or more measuring cups or spoons include a handle and a measuring container. The measuring container is formed with a volumetric capacity such as a fraction of a cup, a teaspoon, or a tablespoon. The handle of a first measuring container includes a feature that interacts with a complementary feature on the handle of a second measuring cup to secure the first and second cups together.

9 Claims, 5 Drawing Sheets

(56) References Cited

U.S. PATENT DOCUMENTS

| | | | |
|---|---|---|---|
| D403,660 S | 1/1999 | Conforti et al. | |
| D404,663 S | 1/1999 | Prindle | |
| 5,918,922 A | 7/1999 | Lathrop et al. | |
| D412,448 S | 8/1999 | Bentson | |
| 6,116,772 A | 9/2000 | DiGiacomo et al. | |
| D438,125 S | 2/2001 | Kaposi et al. | |
| D440,164 S * | 4/2001 | Kerr | D10/46.3 |
| D443,836 S | 6/2001 | Wright | |
| 6,263,732 B1 | 7/2001 | Hoeting et al. | |
| D450,605 S | 11/2001 | Wright | |
| 6,543,284 B2 | 4/2003 | Hoeting et al. | |
| D480,318 S | 10/2003 | Settele | |
| D484,425 S | 12/2003 | Settele | |
| D486,745 S | 2/2004 | Mastroianni | |
| D494,877 S | 8/2004 | Kempe et al. | |
| D514,458 S | 2/2006 | Lawson et al. | |
| D518,391 S | 4/2006 | McGuyer | |
| D518,392 S | 4/2006 | Kaposi | |
| D530,632 S | 10/2006 | Kaposi | |
| D532,321 S | 11/2006 | Heiligenstein et al. | |
| D548,115 S * | 8/2007 | Sawhney et al. | D10/46.2 |
| D548,116 S | 8/2007 | Curtin | |
| D582,798 S * | 12/2008 | Mantilla et al. | D10/46.3 |
| 7,753,206 B2 * | 7/2010 | Sawhney et al. | 206/514 |
| 8,123,067 B2 * | 2/2012 | Thomson | 220/573.5 |
| 2008/0017540 A1 * | 1/2008 | Sawhney et al. | 206/514 |
| 2011/0272317 A1 * | 11/2011 | Wnek et al. | 206/515 |

* cited by examiner

SNAP-FIT MEASURING CONTAINER

PRIORITY CLAIM

This application is a continuation-in-part of U.S. application Ser. No. 13/023,252, filed Feb. 8, 2011.

FIELD OF THE INVENTION

The present invention relates to measuring cups and measuring spoons.

BACKGROUND OF THE INVENTION

Measuring cups and measuring spoons are commonly provided in a set in which an array of differently-sized cups or spoons are provided. The cups or spoons are typically stackable for more compact storage. Though stackable, they are not held in place and tend to separate from one another readily upon opening a drawer in which they are stored.

Measuring spoons are sometimes configured with a ring that permanently connects the array of spoons together. Though this ensures that each of the spoons can be readily located together with the others, it can be cumbersome and requires the user to hold all of the spoons together in use. It also requires all of them to be washed together, even if otherwise unnecessary for some of the spoons.

SUMMARY OF THE INVENTION

The present invention includes a measuring cup or spoon having a handle and a measuring container. The handle of a first measuring cup includes a feature that interacts with a complementary feature on the handle of a second measuring cup to secure the first and second cups together.

In a preferred version of the invention, a rib extends downward from the handle of the first cup and is received within a channel formed in the handle of the second cup. The rib and channel are sized such that the two cups are frictionally held together.

In some versions, a set of several measuring cups is provided in which each one of the cups includes a handle having a similar fastening feature.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
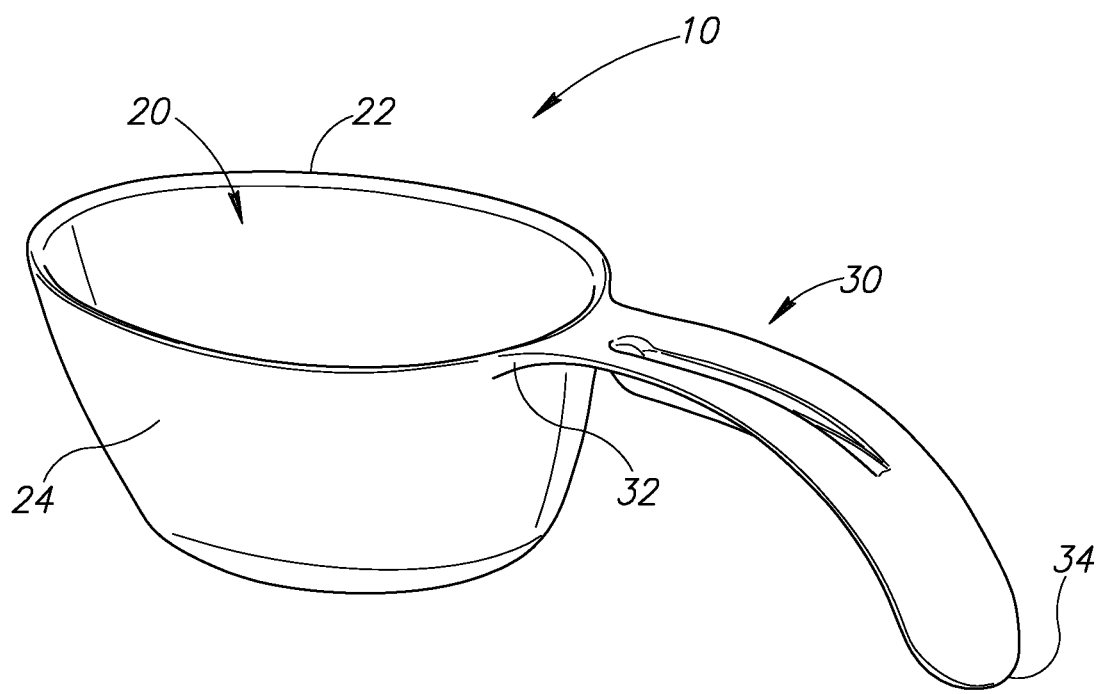
FIG. 1 is a top perspective view of a preferred measuring cup.
Figure 5:
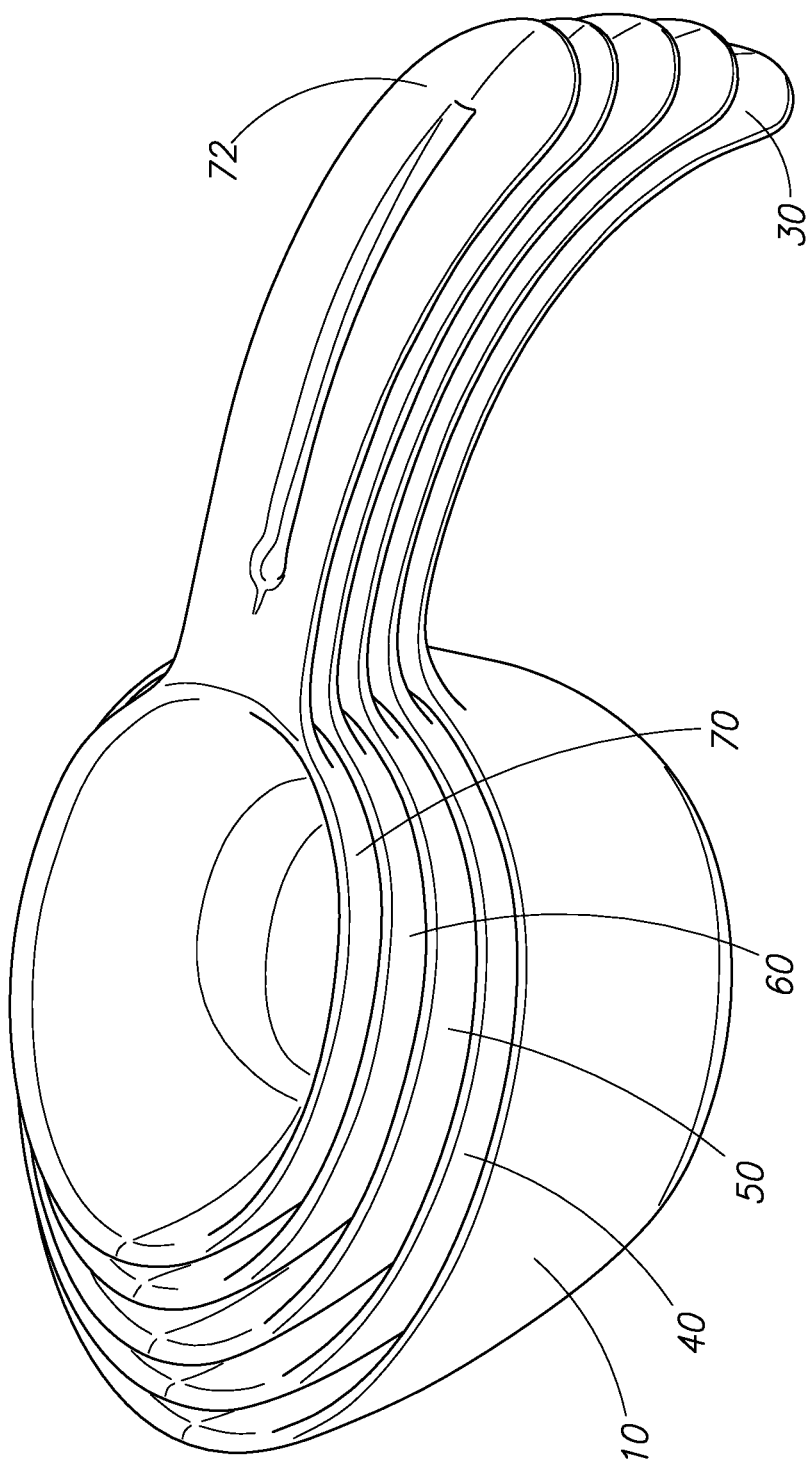
FIG. 5 is a top perspective view of a preferred set of measuring cups, shown nested together.

A preferred measuring container 10 includes a measuring vessel 20 and a handle 30. In the particular version as illustrated in FIG. 1, the measuring vessel is in the form of a measuring cup. As shown, the measuring vessel has a nominal or predetermined volume such as ¾ cup. As seen in FIG. 5, measuring cups of other sizes may also be formed in accordance with the invention, including for example cups having vessels with volumes of ¼ cup, ⅓ cup, ½ cup, ⅔ cup, or other particular volumes.

The same principles of the invention are also applicable to measuring devices having smaller measuring vessels, such as measuring spoons. Thus, for example, the measuring spoons may have volumes such as ⅛ teaspoon, ¼ teaspoon, ½ teaspoon, 1 teaspoon, 1 tablespoon, or other volumes.

The preferred vessel 20 includes a floor having sidewalls 24 extending upward and terminating in a rim 22. Most preferably the floor is substantially flat along at least a portion of its surface, though the bottom portion of the vessel may have any shape. As noted above, the vessel preferably is formed with a known volume in order to serve as a measuring cup or spoon. The vessel may, however, have an indeterminate or less precise volume.

The vessel includes a handle 30 extending laterally away from the vessel. Most preferably a proximal end 32 of the handle is attached to the vessel substantially at the rim 22 of the vessel, though the handle may alternatively be secured to the vessel at a different location such as along the sidewalls at a location below the rim. The handle extends laterally away from the vessel, terminating in a distal end 34 of the handle.

Figure 2:
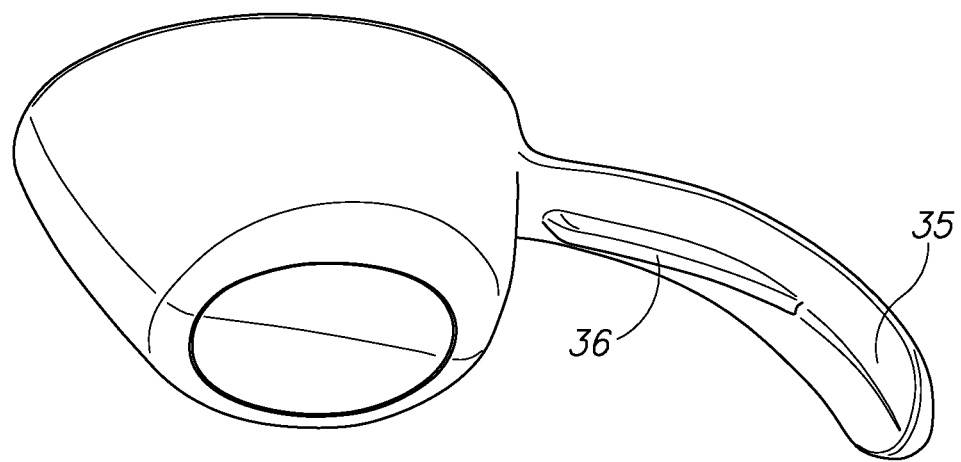
FIG. 2 is a bottom perspective view of a preferred measuring cup.

As best seen in FIG. 2, the handle includes a feature for connecting the handle of a first cup to the handle of a second cup having a mating feature. In the version as illustrated, the lower side 35 of the handle includes a downwardly-depending rib 36. The rib projects substantially vertically downward from the handle, in a direction substantially perpendicular to the lower side of the handle.

Most preferably, the rib 36 is elongated, having a length (in the direction from the proximal end of the handle toward the distal end of the handle) that is much greater than the width of the rib. In the version as shown, the length of the rib is approximately half the length of the handle. In other versions, the rib may be much smaller, such as ⅓ or ¼ of the length of the handle. In alternate versions, the rib may be longer and may extend along the entire length of the handle.

As shown, the rib extends in a direction that is generally parallel with the direction of the handle. In other words, the longest side of the rib is one that extends in a direction from the proximal end of the handle toward the distal end of the handle. In other versions, the rib may be substantially square in cross-section, having a length and width that are equal. In yet other versions, the rib may be wider than it is long, therefore being formed in a way that is generally perpendicular to the version as illustrated. The lateral rib as illustrated is preferred however, in part because it allows for a long rib with a large surface area of contact between the rib and mating surface of another measuring device, thereby providing a stronger connection between two devices. At the same time, the nature of the rib and the handles allows a user to separate them from one another readily, as described further below.

Figure 3:
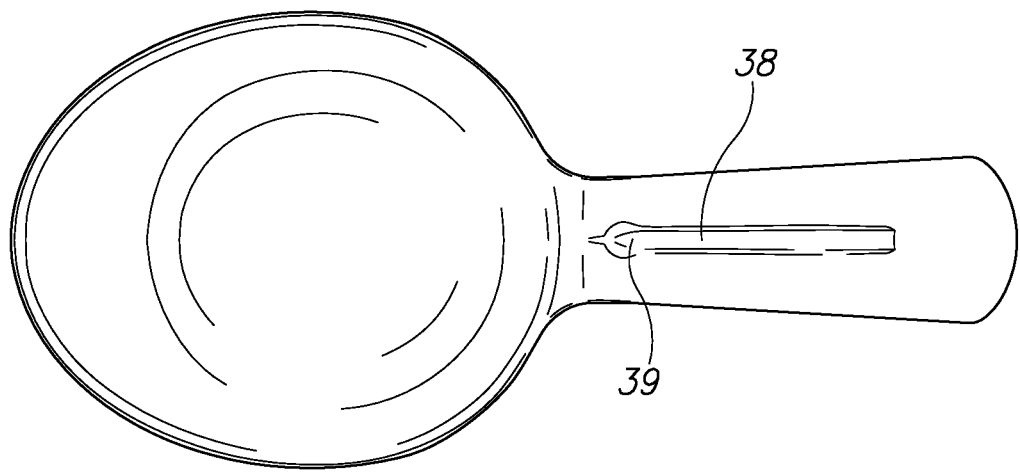
FIG. 3 is a top plan view of a preferred measuring cup.

As best seen in FIG. 3, an upper surface of the handle includes a channel 38. The channel is formed to receive the rib 36 of a mating measuring cup, and therefore has a depth, length, and width to allow the interconnection. In one preferred version of the invention, the width of the channel is equal to or slightly less than that of the rib so that the rib will be frictionally and snugly received within the channel. In one example, the sidewalls of the rib and the channel are each substantially vertical, thereby relying on the snugness of the fit between the rib and the channel to provide a frictional force to hold two measuring devices together. In an alternate version, the rib and the channel are each trapezoidal in cross section. Thus, at a location closest to the lower surface of the handle the rib is somewhat narrower and then the sides of the rib flare outwardly somewhat to form a wider base. Likewise, in such a version, the opening of the channel adjacent the upper surface of the handle is narrower than the bottom surface of the channel, with the sidewalls of the channel flaring outwardly somewhat. By forming the base of the rib so that it is slightly larger than the opening of the channel, an additional force is required to force the rib into or out of the channel. Consequently, once the rib is forced into the channel, a pair of measuring devices will remain connected with one another until a threshold force is applied to urge them apart again.

At one end of the channel, preferably relatively closer to the proximal end of the handle, the channel widens to form a mouth 39 that is larger than the width of the opening of the channel along the rest of the length of the channel. The widened mouth facilitates removal of the first device from the second device.

Figure 4:
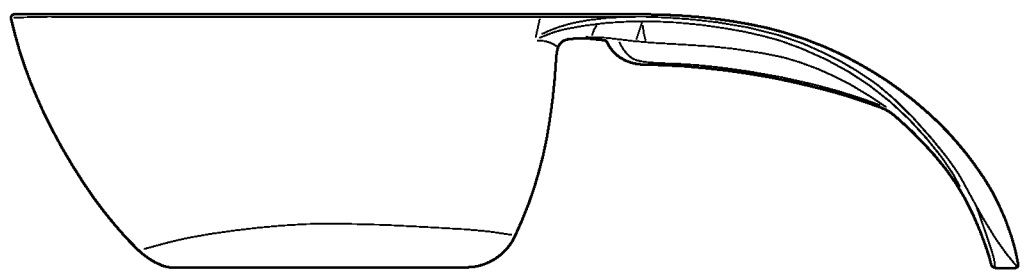
FIG. 4 is a side view of a preferred measuring cup.

As shown in FIG. 4, the handle of the measuring device may curve downwardly in a direction from the rim toward the floor of the vessel as the handle extends laterally away from the proximal end toward the distal end. In other versions, the handle may be generally or completely flat or horizontal.

In some versions of the invention, a set of several measuring devices is provided. Thus, as seen in FIG. 5, a set of five measuring cups is provided together. Each measuring device includes a vessel or cup 10, 40, 50, 60, 70. Each also includes a corresponding handle (e.g., 30, 72). Most preferably, the handle 30 of the largest cup 10 has a sharper angle of curvature than the handle 72 of the smallest cup. This gradual reduction of curvature from the largest to the smallest aids in the nesting of the cups within one another. In addition, the handle lengths, together with the curvature, are preferably formed such that the handle 72 of the smallest cup is the shortest, with the handles within the set becoming progressively longer as the size of the cup increases. The handle 30 for the largest cup 10 is the longest in the preferred version of the invention. As shown in FIG. 5, this progressive curvature and increase in size of the invention allows the handle of each one of the separate cups to have a portion of its upper surface that is not covered by the handle of a cup nested within it. Consequently, intermediate sized cups are readily accessible and separable from the others by quickly grasping the exposed portion of the distal end of the desired cup.

Within a set of measuring devices, the width of the channel and the rib must also increase as the size of the cups progresses in one direction or the other. In the preferred version, the smallest measuring device has a rib and channel that is smaller than that of any of the others, with the largest measuring device having the largest rib and channel. Intermediate devices have ribs and channels that gradually increase in width from the smallest one to the largest one, with each individual rib being sized to be snugly received within the channel of the next-largest measuring device.

The progression in sizes of channels and ribs may be configured in the opposite way in other versions of the invention. Thus, the smallest measuring device may have the largest channel and rib while the largest measuring device having the smallest channel and rib. The intermediate devices then will have channels and ribs that decrease in size from the smallest vessel to the device having the largest vessel.

As noted above, the same principles of the invention may be applied to measuring devices having vessels of any size. Thus, for example, each one of a set of measuring spoons may include a vessel that is smaller than the measuring cups. Most preferably, the measuring spoons have predetermined volumes in fractions or multiples of teaspoons or tablespoons. The handles of the measuring spoons are formed in accordance with the handles of the measuring cups as described above, each one of the handles having a feature for joining the handle to an adjacent handle of a measuring spoon of a different size. In addition, a set of measuring spoons preferably has handles of varying curvature, with a smallest measuring spoon having a handle that is relatively flatter than the others and a largest measuring spoon having a handle that is relatively more curved than the others.

In the version as shown and described above, the attachment feature is in the form of a rib and a channel, the rib being formed on the lower side and the channel being formed on the upper side of the handle. In other versions of the invention, the rib may extend upwardly from the upper side of the handle, thereby forming a channel within the lower surface of the handle.

Figure 6:
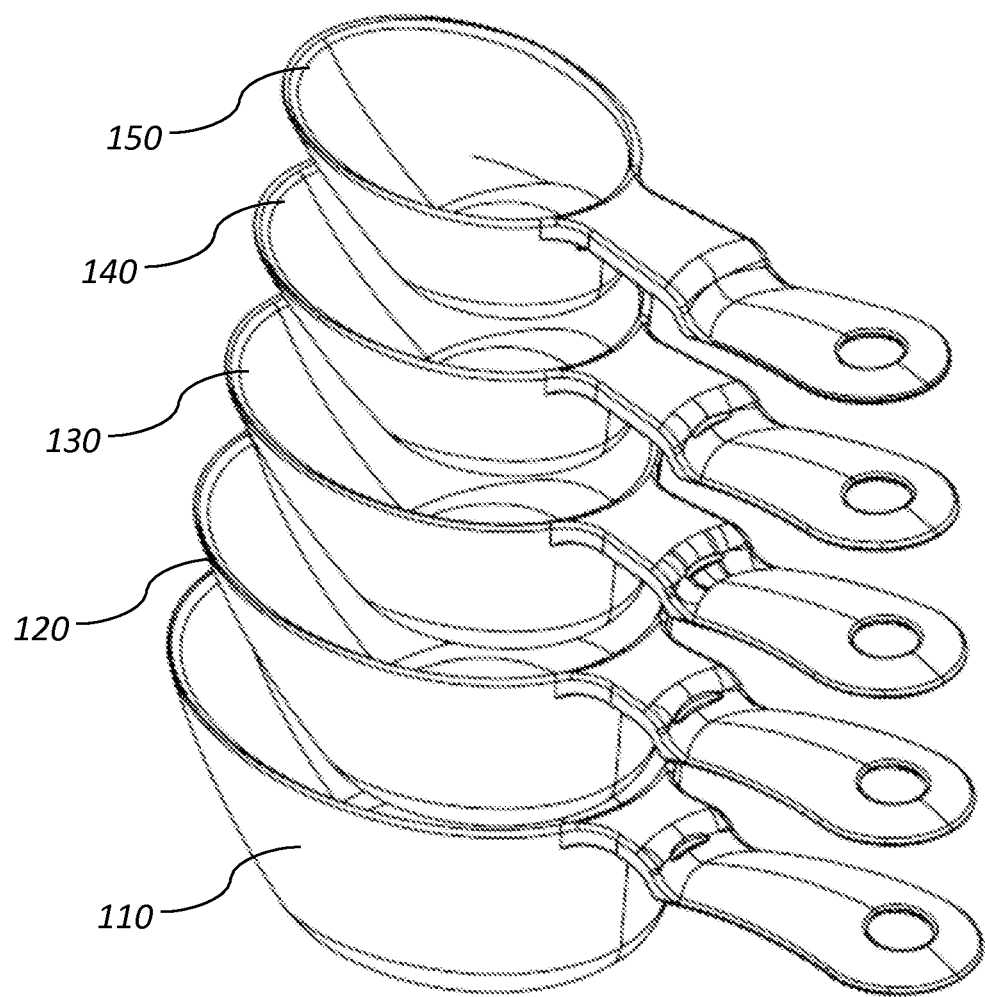
FIG. 6 is a perspective view of an alternate preferred set of measuring cups, shown separated from one another.
Figure 7:
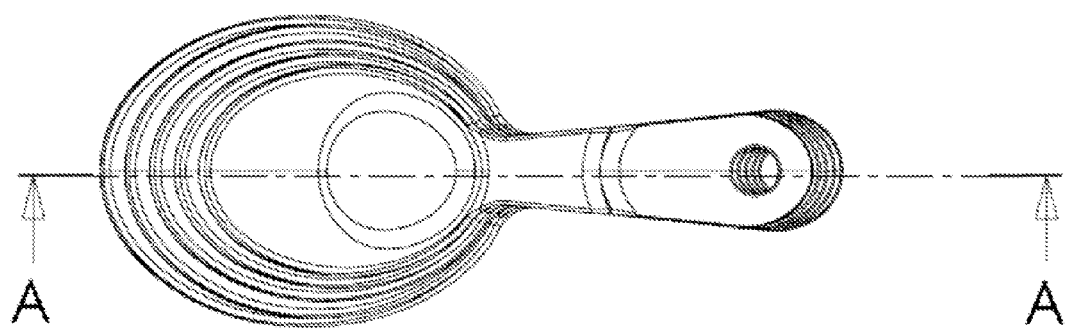
FIG. 7 is a top view of the set of measuring cups of FIG. 6, shown nested together.
Figure 8:
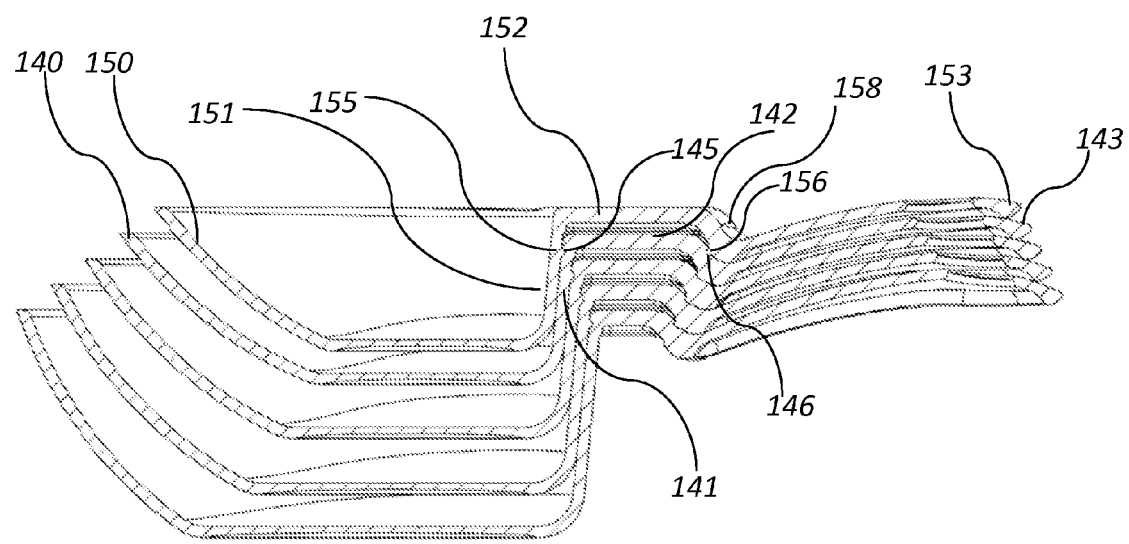
FIG. 8 is a side sectional view of the set of measuring cups of FIG. 7, taken along line A-A of FIG. 7.

In yet another version of the invention, the rib and mating channel may be formed on a handle surface such that they extend substantially laterally toward one another rather than vertically as in the examples primarily described above. With reference to FIGS. 6-8, an alternate set of measuring cups is shown, in this case containing five cups 110, 120, 130, 140, 150. As best seen in the sectional view of FIG. 8, the preferred cup includes a front portion that may be inclined in the shape of a pouring spout and a rearward portion with a substantially vertical or otherwise upwardly extending sidewall. The rear sidewall is attached to a handle having a proximal lateral portion adjacent the rear sidewall and a distal portion extending away from the proximal portion, with a central angled portion between the distal and proximal portions. In the preferred version as illustrated, the central angled portion extends downward from the proximal portion at an angle of about 45 degrees or greater. In other versions, the central section is angled downward at between about 30 degrees and 60 degrees with respect to the proximal portion. Thereafter the distal portion extends laterally away from the central portion. In some versions, the distal portion may be substantially horizontal, while in the illustrated version the distal portion is inclined slightly such that it terminates at a point at approximately the same height as that of the proximal portion.

In general, the preferred cup includes a pair of ribs and channels to allow a first cut to be secured to a second cup. As best seen in FIG. 8, a first cup 150 includes a rearward sidewall 151 that transitions to a proximal handle portion 152, with a central handle portion 158 extending between the proximal handle portion 152 and distal handle portion 153. A first rib 155 is formed on the rear sidewall 151 along an outer surface adjacent the proximal portion of the handle. A second rib 156 is formed on a lower surface of the central portion of the handle such that it projects inward, toward the first rib and the rear sidewall.

In each case the handle portions define a width generally perpendicular to the length from the proximal portion to the distal portion. In some versions the rib may extend across the entire width of the handle, while in other versions the rib may be narrower than the width of the handle. Similarly, the channel may extend across the entire width or may be narrower than the width of the handle. Likewise, the channel need not be recessed below the handle surfaced, but may be formed as a well between two adjacent raised surfaces.

A second cup 140 is formed with mating surface is configured to engage the first rib and the second rib of the first cup 150. Thus, the second cup 140 includes a rear sidewall 141 that transitions to a proximal handle portion 142 and terminates in a distal handle portion 143, with a central handle portion between the proximal and distal handle portions. As with the first cup, the second cup includes a pair of inward-facing ribs, one formed on an outer surface of the rear sidewall and one formed on the lower surface of the central portion. In addition, the handle of the second cup 140 includes a pair of channels configured to receive the pair of ribs formed on the first cup 150. Thus, the second cup includes a first channel 145 formed along the rear sidewall of the second cup and a second channel 146 formed on an upper surface of the central portion. In each case, the channels formed on the second cup 140 are positioned such that they can snugly receive the ribs formed on the first cup 150 when the first cup is nested fully within the second cup as illustrated in FIG. 8.

In the set of cups as illustrated in FIG. 8, five cups are shown. For each of the middle three cups, the handle includes a pair of ribs extending laterally inward and a pair of channels facing laterally outward. The top cup (which is the smallest) only includes an internal pair of inward facing ribs, while the bottom cup (which is the largest) only includes a pair of outward facing channels. Thus, the set as illustrated is configured such that five cups can be nested and secured together.

In alternate version of the invention, the ribs and channels may be reversed, such that the cups include a pair of outward facing ribs and inward facing channels. Similarly, in another version each cup may have one outward facing rib and channel and one inward facing rib and channel. In general, an upper nesting cup includes a first mating surface formed on an outer surface of the rear sidewall of the cup and a second mating surface formed on an inner surface of the angled central section of the handle. A lower nesting cup includes a third mating surface formed on an inner surface of the rear sidewall of the cup and a fourth mating surface formed on an outer surface of the central section of the handle. When the upper and lower cups are nested together, the first and second mating surfaces engage the third and fourth mating surfaces in order to retain the upper and lower cups in the nested position.

The downward angled nature of the central section of the handle further serves to facilitate separation of the cups from one another. By applying upward pressure against the distal portion 153 of the handle of the upper cup 150, the central portion of the upper cup will be urged laterally outward, away from the rear sidewall 151 of the upper cup, thereby disengaging the rib 156 from the channel 146 of the lower cup. This separation will allow the upper cup 150 to be readily removed from the lower cup 140.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A measuring container set, comprising:
a first measuring container, comprising:
a first measuring vessel having a floor and an upwardly extending first sidewall terminating in a rim, the first measuring vessel forming an interior volume;
a first handle attached to and extending laterally away from the first measuring vessel, the first handle having a first proximal portion attached to the first sidewall, a first central portion angling downward from the first proximal portion, and a first distal portion extending laterally away from the first central portion;
a second measuring container, comprising:
a second measuring vessel having a floor and an upwardly extending second sidewall terminating in a rim, the measuring vessel forming an interior volume;
a second handle attached to and extending laterally away from the second measuring vessel, the second handle having a second proximal portion attached to the second sidewall, a second central portion angling downward from the second proximal portion, and a second distal portion extending laterally away from the second central portion;
a first laterally-extending rib formed on one of the first central portion or the second central portion;
a second laterally-extending rib formed on one of the first sidewall or the second sidewall;
a first laterally-extending channel formed on one of the first central portion or the second central portion; and
a second laterally-extending channel formed on one of the first sidewall or the second sidewall;
whereby when the first measuring container is nested within the second measuring container, the first rib engages the first channel and the second rib engages the second channel to retain the first measuring container within the second measuring container.

2. The measuring container set of claim 1, wherein the first rib is formed on the first central portion and extends laterally toward the first sidewall, and wherein the second rib is formed on the first sidewall and extends laterally toward the first central portion.

3. The measuring container set of claim 2, wherein the first channel is formed on the second central portion and faces laterally toward the second distal portion, and wherein the second channel is formed on the second sidewall and faces laterally toward the interior of the second measuring container.

4. The measuring container set of claim 1, wherein the first distal handle portion is angled upward as it extends laterally away from the first central portion.

5. The measuring container set of claim 1, wherein the central section forms an angle of about 45 degrees with respect to the proximal portion.

6. The measuring container set of claim 1, wherein the central section forms an angle of between 30 degrees and 60 degrees with respect to the proximal portion.

7. The measuring container set of claim 1, wherein the first handle has a width that is greater than the width of the first rib.

8. The measuring container set of claim 1, wherein the second handle has a width that is greater than the width of the first rib.

9. The measuring container set of claim 1, wherein the first handle has a width that is greater than the width of the first channel.

* * * * *